United States Patent [19]
Aoki et al.

[11] Patent Number: 4,881,797
[45] Date of Patent: Nov. 21, 1989

[54] COLOR LIQUID CRYSTAL DISPLAY DEVICE

[75] Inventors: Shigeo Aoki, Habikino; Katsumi Miyake, Nara; Yasuhiro Ugai, Yao, all of Japan

[73] Assignee: Hosiden Electronics Ltd., Osaka, Japan

[21] Appl. No.: 232,514

[22] Filed: Aug. 16, 1988

Related U.S. Application Data

[63] Continuation of Ser. No. 812,887, filed as PCT JP 85/00220 on Apr. 19, 1985, published as WO85/04962 on Nov. 7, 1985, abandoned.

[30] Foreign Application Priority Data

Apr. 20, 1984 [JP] Japan ................................ 59-103

[51] Int. Cl.$^4$ .................... G02F 1/133; G02F 1/137
[52] U.S. Cl. ............................ 350/339 F; 350/333; 350/339 R
[58] Field of Search ............ 350/339 F, 339 R, 334, 350/333, 336

[56] References Cited

U.S. PATENT DOCUMENTS

| | | | |
|---|---|---|---|
| 4,386,836 | 6/1983 | Aoki et al. | 350/346 |
| 4,506,956 | 3/1985 | Dir | 350/339 F |
| 4,569,574 | 2/1986 | Masaki et al. | 350/336 X |
| 4,589,732 | 5/1986 | Shiraishi et al. | 350/331 R |
| 4,600,274 | 7/1986 | Morozumi | 350/339 F |

*Primary Examiner*—Stanley D. Miller
*Assistant Examiner*—Anita P. Gross
*Attorney, Agent, or Firm*—Pollock, Vande Sande and Priddy

[57] ABSTRACT

A color liquid crystal display device comprises first and second transparent substrates, and a liquid crystal sealed therebetween. A plurality of display electrodes and thin film transistors each connected to each of the display electrodes are formed on the first transparent substrate. Color filters are formed on the second transparent substrate such that they each face each of the display electrodes. A common electrode is also formed over the entire surface of the second transparent electrode. The gap between adjacent color filters is closed by a metal layer capable of blocking light. These light-blocking layers overlie the common electrode in contact therewith.

3 Claims, 4 Drawing Sheets

COLOR LIQUID CRYSTAL DISPLAY DEVICE

This is a continuation of Ser. No. 812,887, filed as PCT JP85/00220 on Apr. 19, 1985, published as WO85/04962 on Nov. 7, 1985, now abandoned.

FIELD OF THE INVENTION

This invention relates to a color liquid crystal display device which is used for the display of an image, for instance, and has a plurality of display electrodes formed in a liquid crystal cell, these display electrodes being selectively driven by thin film transistors for color display of an image.

PRIOR ART

The prior art liquid crystal display device of the type noted has a structure as shown in FIG. 1. As is shown, the device comprises transparent substrates 11 and 12 of glass or the like facing each other. The substrates 11 and 12 are spaced apart by a spacer 13 provided along their edges. A liquid crystal 14 is sealed in between the transparent substrates 11 and 12. A plurality of display electrodes 15 are formed on the inner surface of the substrate 11. Thin film transistors 16 are formed contiguous to the respective display electrodes 15. These thin film transistors 16 serve as switching elements with their drains connected to the display electrodes 15. A transparent common electrode 17 is formed substantially on the entire inner surface of the other transparent substrate 12, and it faces the plurality of display electrodes 15.

The display electrodes 15 may serve as picture element electrodes. For example, the display electrodes 15 are square and arranged in rows and columns on the transparent substrate 11 as shown in FIG. 2. In actual practice, the display electrodes 15 are arranged in a closely spaced-apart relation to one another. Gate buses 18 are formed near and along the respective rows of display electrodes 15. Source buses 19 are formed near and along the respective columns of the display electrodes 15. The thin film transistors 16 are provided at the intersections of the gate buses 18 and source buses 19. The individual thin film transistors 16 have their gates and sources connected to the corresponding gate buses 18 and source buses 19, respectively, at the intersections of these buses. Their drains are connected to the display electrodes 15.

A voltage is applied between a selected one of the gate buses 18 and a selected one of the source buses 19. As a result, the corresponding thin film transistor 16 is turned on. Charge is thus stored on the display electrode 15 connected to the drain of this "on" thin film transistor 16. A voltage is applied across the liquid crystal 14 between the display electrode 15 noted above and the common electrode 17. Only this display electrode 15 thus becomes transparent or opaque for selective display. The display can be erased by causing the discharge of the display electrode 15.

Heretofore, the thin film transistors 16 have been formed as shown in FIGS. 3 and 4. The display electrodes 15 and source buses 19 are formed as a transparent conductive film, e.g., ITO, on the transparent substrate 11. Semiconductor layers 21 of amorphous silicon or like material are each formed to bridge the parallel and closely spaced apart regions of each display electrode 15 and the associated source bus 19. A gate insulating film 22 of silicon nitride or the like is formed to cover the semiconductor layers 21. Gate electrodes 23 are each formed over each semiconductor layer 21 via the gate insulating film 22 such as to partly overlap the associated display electrode 15 and source bus 19. The gate electrodes 23 have their one ends connected to the associated gate buses 18. The display electrode 15 and source bus 19 that correspond to each gate electrode 23 thus constitute a drain electrode 15a and a source electrode 19a, respectively. Each thin film transistor 16 is constituted by the electrodes 15a and 19a, semiconductor layer 21, gate insulating film 22 and gate electrode 23. The gate electrodes 23 and gate buses 18 are formed simultaneously from aluminum, for instance.

Either a red filter 1R, a green filter 1G or a blue filter 1B is formed on the transparent substrate 12 such that it faces each display electrode 15. The color filters noted above are formed such that they are distributed substantially uniformly as shown in FIG. 3.

A light source 24, as shown in FIG. 4, is disposed behind the transparent substrate 11. Light from this light source 24 or other light is transmitted through the liquid crystal display device according to a liquid crystal cell control state of the device, and the display state of the device can be seen from the side of the transparent substrate 12. A polarizer (not shown) is provided on one or each side of the liquid crystal display device. The liquid crystal display device may be either a normally black type, i.e., a so-called negative type, in which light is not transmitted through the device in the absence of voltage applied between common electrode 17 and display electrode 15, or a normally white type, i.e., a so-called positive type, in which light is transmitted through the device in the absence of voltage applied between common electrode 17 and display electrode 15.

With the prior art liquid crystal display device as described above, however, light transmitted through other portions of the device than the display electrodes, as indicated by arrows 25 and 26 in FIG. 4, will reduce the contrast and color purity, thus deteriorating the image quality. Particularly in the case of the normally white type light of the same light intensity as light transmitted through the display electrodes 15 has great adverse effects on the image quality.

Accordingly, there has been proposed an arrangement, which uses black filters filling the gap between adjacent color filters. The black filter, however, is formed by overlaying red, green and blue filters. Therefore, the formation of the black filters, particularly mask alignment steps, is rather cumbersome. Besides, it is necessary to provide a considerable thickness to permit sufficient blocking of light. Therefore, a large number of steps and long time have been necessary for the formation of the black filter.

Further, where the display area is large, contrast irregularities and other defects will be caused in the display by a voltage drop in the common electrode 17, local disconnection thereof, etc.

An object of the present invention is to provide a color liquid crystal display element which has high contrast and color purity, is free from contrast fluctuations, ensures satisfactory image quality and can be simply fabricated.

To attain the above object of the invention, there is provided a color liquid crystal display device which comprises first and second transparent substrates spaced apart a small distance and facing each other, a liquid crystal sealed between the two transparent substrates, a plurality of transparent display electrodes provided on the inner side surface of the first transparent substrate, thin film transistors formed on the first transparent substrate and each connected to each of the display electrodes, a transparent common electrode formed substantially on the entire inner side surface of the second transparent substrate, and color filters each facing each of the display electrodes, and in which the gap between adjacent ones of the color filters is closed by a metal layer capable of blocking light, the light-blocking layers being in contact with the common electrode.

The light-blocking layer formed to close the gap between adjacent color filters blocks light, so that it is possible to obtain a display of high contrast and color purity. In addition, since the light-blocking layer is made of a metal, it can be formed easily. Further, since the light-blocking layer overlies the common electrode, it can correspondingly reduce the voltage drop in the common electrode due to the resistance thereof. Further, even if there is a local broken portion of the common electrode, voltage can be applied uniformly to the entire common electrode, so that it is possible to obtain a satisfactory image quality free from contrast fluctuations.

DESCRIPTION OF THE PREFERRED EMBODIMENTS

Figure 1:
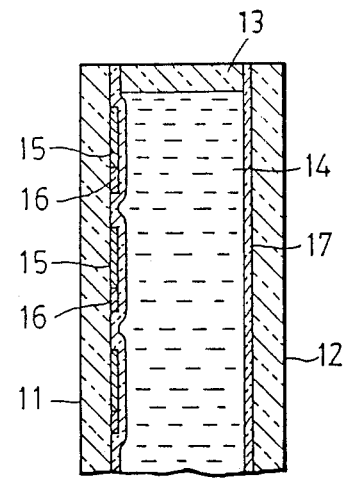
FIG. 1 is a fragmentary schematic sectional view showing the structure of a prior art liquid crystal display device.
Figure 2:
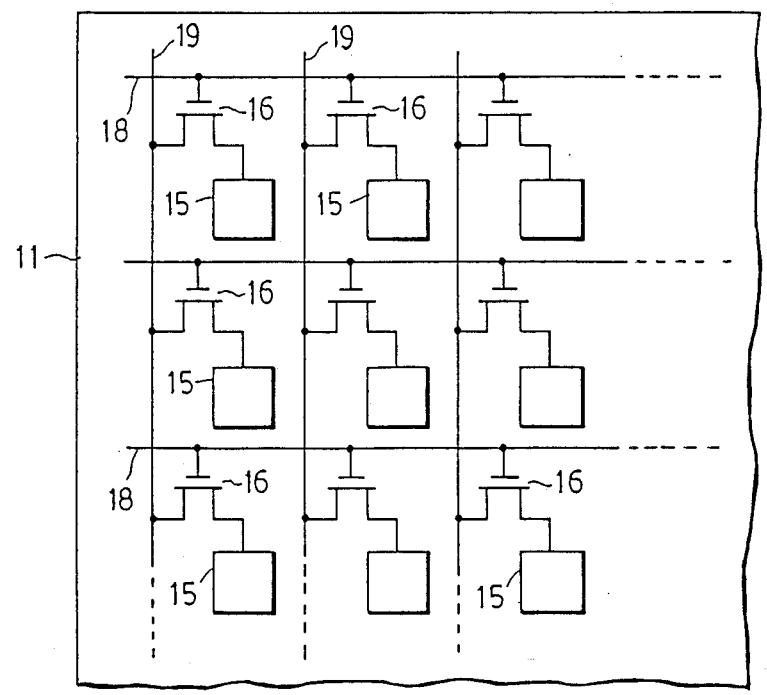
FIG. 2 is a circuit diagram showing an equivalent electric circuit of a matrix type liquid crystal display device.
Figure 3:
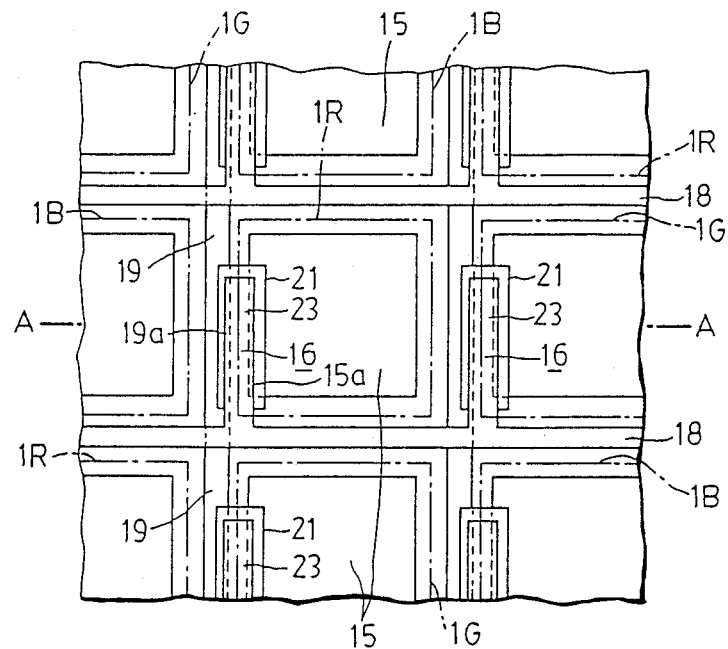
FIG. 3 is a plan view showing the arrangement of display electrodes and thin film transistors of a prior art color liquid crystal display element.
Figure 4:
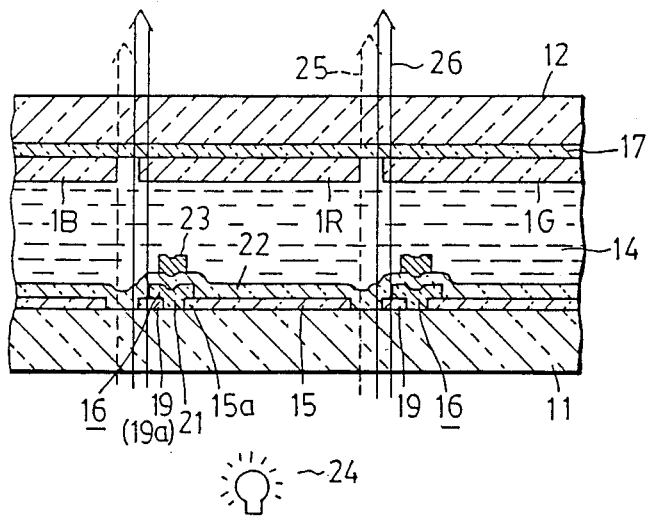
FIG. 4 is a sectional view taken along line A—A in FIG. 3.
Figure 5:
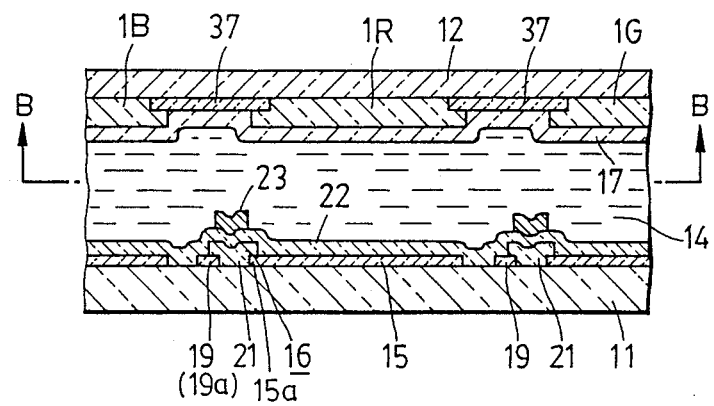
FIG. 5 is a fragmentary sectional view showing an embodiment of the color liquid crystal display device according to the invention.
Figure 6:
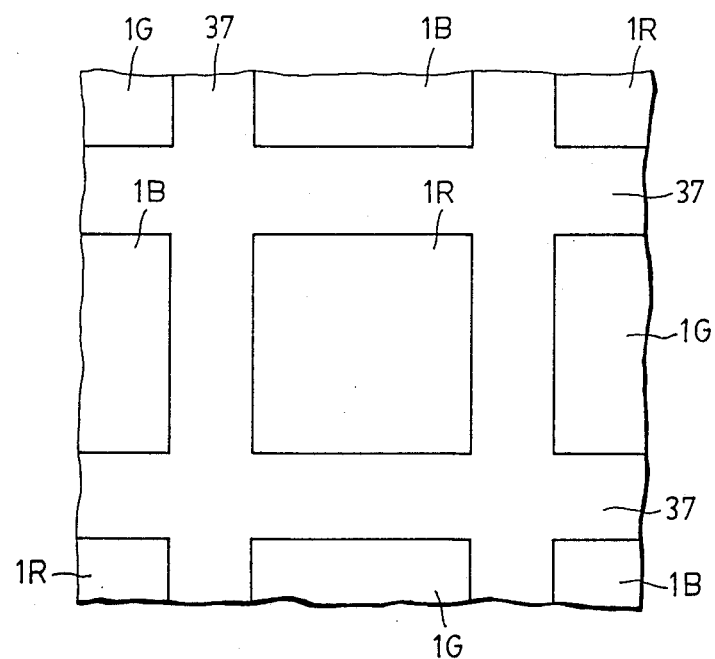
FIG. 6 is a fragmentary plan view showing the positional relation between color filters and light-blocking layers in the color liquid crystal display device shown in FIG. 5.

FIGS. 5 and 6 illustrate an embodiment of the color liquid crystal display element according to the invention. In these Figures, parts like those shown in FIGS. 3 and 4 are designated by like reference numerals, and they will not be described any further.

In this embodiment, the gap between adjacent ones of color filters 1R, 1G and 1B, is closed by a metal light-blocking layer 37 which can block light. The light-blocking layer 37 is made of a metal, e.g., aluminum and chromium. Its thickness is about 2,000 to 3,000 Å and it is formed by means of vacuum deposition or spattering. A common electrode 17 is formed to overlie the light-blocking layers 37. In this embodiment, the light-blocking layers 37 are formed on a transparent substrate 12, the color filters 1R, 1G and 1B are then formed, and then the common electrode 17 is formed over the entire surface area.

Figure 7:
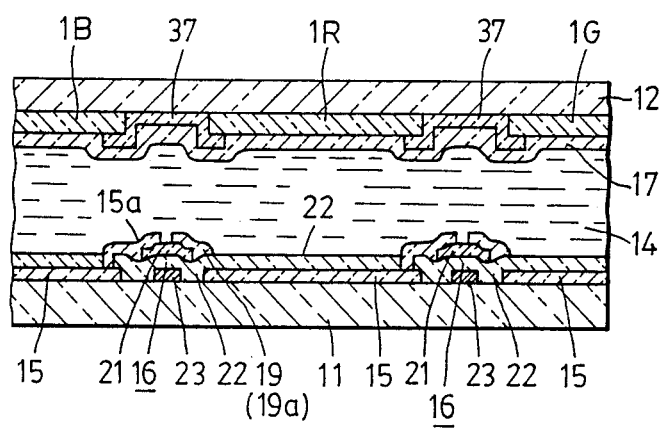
FIG. 7 is a fragmentary sectional view showing a different embodiment of the color liquid crystal display device according to the invention.

FIG. 7 shows an alternate arrangement. In this instance, the color filters 1R, 1G and 1B are formed on the transparent substrate 12, then the light-blocking layers 37 are formed, and then the common electrode 17 is formed. FIG. 7 also shows an alternate structure of the thin film transistors 16. Each thin film transistor 16 in this case comprises display electrode 15, gate electrode 23 and gate bus, these parts being formed on a transparent substrate 11, gate insulating film 22 formed on the gate electrode 23, semiconductor layer 21 formed on the gate insulating film 22, and drain and source electrodes 15a and 19a and source bus 19, these parts being formed on the semiconductor layer 21.

The color display may be obtained by using at least two different kinds of color filters. Further, the display electrode 15, which is used as a picture element electrode in the above cases, may have various other shapes as well.

As has been described in the foregoing, with the color liquid crystal display device according to the invention the gap between adjacent color filters is filled by the light-blocking layer 37 to block unnecessary light that may otherwise be transmitted through the gap between adjacent color filters. Contrast and color purity thus can be improved. In addition, the light-blocking layers 37, which are made of a metal, may be formed very easily compared to the black filters.

Further, since the light-blocking layer 37 is in the overlying relation to and contiguous to the common electrode 17, the resultant resistance of the common elcctrode 17 and light-blocking layer 37 may be reduced. Thus permits more uniform voltage to be applied to the common electrode 17 to reduce or alternate contrast fluctuations.

Further, when the common electrode 17 is formed after the formation of the color filters, breakage of the common electrode 17 is liable to result from the steps of the edges of the color filters. The presence of the light-blocking layers 17, however, will make up for any breakage of the common electrode 17, and permits uniform voltage application thereto. The prevention of the breakage of the common electrode 17 is promoted by the structure, where the light-blocking layers 37 overlie the color filters on the side thereof opposite the transparent substrate 12. With common electrode 17 formed on the color filters, the gap between common electrode 17 and display electrode 15 may be reduced correspondingly, thus permitting effective application of voltage across the liquid crystal 14 between these electrodes.

The invention is applicable not only to liquid crystal display devices of the transmission type but also to liquid crystal display devices of the reflective type.

We claim:

1. A color liquid crystal display device comprising first and second transparent substrates spaced apart a small distance and facing each other, a liquid crystal sealed between said two transparent substrates, a plurality of transparent display electodes provided on the inner side surface of said first transparent substrate, thin film transistors formed on said first transparent substrate and each connected to each of said display electrodes, a transparent common electrode formed substantially on the entire inner side surface of said second transparent substrate, and color filters each facing each of said display electrodes, the improvement wherein:

said color filters are separated from one another by a gap which is defined between the opposing side edges of adjacent ones of said color filters, each gap between adjacent ones of said color filters being closed by a metal layer capable of blocking light, said light-blocking layers being formed on said second substrate and having marginal edges underlying the marginal edges of said color filters, and said common electrode extending over and in contact with said color filters and with portions of said light-blocking layers between said color filters.

2. The color liquid crystal display device according to claim 1, wherein said common electrode is formed on the side of said color filters and light-blocking layers opposite to said second transparent substrate.

3. The color liquid crystal display device according to one of claims 1 or 2, wherein said display electrodes are picture element electrodes and are arranged in a matrix array, the source electrodes of the thin film transistors in each column of said matrix array are connected to a common source bus, the gate electrodes of the thin film transistors in each row of said matrix array are connected to a common gate bus, and said color filters exhibit a plurality of different colors, with color filters of like color being distributed substantially uniformly.

* * * * *